(12) United States Patent
Illy

(10) Patent No.: US 10,586,417 B2
(45) Date of Patent: Mar. 10, 2020

(54) PERSONALIZED SELECTOR DEVICE OF SUBSTANCES TO OBTAIN AND OPTIMIZE MIXTURES ABLE TO GENERATE BEVERAGES AND CONNECTED METHOD

(71) Applicant: ILLYCAFFE' SPA CON UNICO SOCIO, Trieste (IT)

(72) Inventor: Andrea Illy, Trieste (IT)

(73) Assignee: ILLYCAFFE' SPA CON UNICO SOCIO, Trieste (IT)

( * ) Notice: Subject to any disclaimer, the term of this patent is extended or adjusted under 35 U.S.C. 154(b) by 0 days.

(21) Appl. No.: 15/505,880

(22) PCT Filed: Aug. 13, 2015

(86) PCT No.: PCT/EP2015/068681
§ 371 (c)(1),
(2) Date: Feb. 22, 2017

(87) PCT Pub. No.: WO2016/026770
PCT Pub. Date: Feb. 25, 2016

(65) Prior Publication Data
US 2017/0287257 A1  Oct. 5, 2017

(30) Foreign Application Priority Data

Aug. 22, 2014  (IT) .............................. UD2014A0146

(51) Int. Cl.
*G07F 13/06* (2006.01)
*G07F 9/00* (2006.01)
(Continued)

(52) U.S. Cl.
CPC .............. *G07F 9/006* (2013.01); *A47J 31/40* (2013.01); *A47J 31/4414* (2013.01); *A47J 31/52* (2013.01);
(Continued)

(58) Field of Classification Search
CPC ...... B01F 13/1063; A47J 31/40; G07F 13/065
(Continued)

(56) References Cited

U.S. PATENT DOCUMENTS

| 6,349,889 B1 * | 2/2002 | Sandolo | A47F 1/035 241/100 |
| 9,011,955 B2 * | 4/2015 | de Graaff | A47J 31/42 426/518 |
| 9,782,033 B2 * | 10/2017 | Ameye | A47J 31/40 |

(Continued)

FOREIGN PATENT DOCUMENTS

| EP | 2292126 A1 | 3/2011 |
| GB | 2499201 A | 8/2013 |

(Continued)

OTHER PUBLICATIONS

International Search Report and Written Opinion for PCT/EP2015/068681, dated Mar. 24, 2016.
(Continued)

*Primary Examiner* — Timothy R Waggoner
(74) *Attorney, Agent, or Firm* — Marshall, Gerstein & Borun LLP

(57) ABSTRACT

A device to produce personalized mixtures of substances intended to obtain and optimize beverages for a specific individual or user, includes a plurality of containers of basic substances, at least a measuring device and management and control means. The device is associated to the management and control means configured to carry out instructions regarding personalized formulas that express univocal sensory profiles or profiles functional to the specific needs of a specific individual or user.

10 Claims, 2 Drawing Sheets

(51) Int. Cl.
*A47J 31/52* (2006.01)
*G07F 9/02* (2006.01)
*G06Q 30/06* (2012.01)
*G06Q 50/12* (2012.01)
*A47J 31/40* (2006.01)
*A47J 31/44* (2006.01)
*A47J 31/56* (2006.01)
*A47J 31/41* (2006.01)

(52) U.S. Cl.
CPC .......... *A47J 31/56* (2013.01); *G06Q 30/0621* (2013.01); *G06Q 30/0635* (2013.01); *G06Q 30/0643* (2013.01); *G06Q 50/12* (2013.01); *G07F 9/023* (2013.01); *G07F 13/065* (2013.01); *A47J 31/401* (2013.01); *A47J 31/402* (2013.01); *A47J 31/404* (2013.01); *A47J 31/41* (2013.01); *A47J 31/4492* (2013.01)

(58) Field of Classification Search
USPC .................................................. 700/231–236
See application file for complete search history.

(56) References Cited

U.S. PATENT DOCUMENTS

| | | | | |
|---|---|---|---|---|
| 2005/0048461 | A1* | 3/2005 | Lahteenmaki | A61J 3/002 435/3 |
| 2008/0029541 | A1* | 2/2008 | Wallace | B01F 13/1055 222/129.3 |
| 2008/0201241 | A1* | 8/2008 | Pecoraro | G06Q 30/06 705/26.8 |
| 2009/0105875 | A1* | 4/2009 | Wiles | G07F 9/026 700/239 |
| 2010/0185322 | A1* | 7/2010 | Bylsma | A61M 5/1413 700/239 |
| 2014/0072679 | A1* | 3/2014 | Balassanian | A23L 2/52 426/231 |
| 2015/0356885 | A1* | 12/2015 | Chen | G09B 19/0092 426/232 |
| 2016/0055599 | A1* | 2/2016 | Illy | G06Q 30/0621 705/15 |
| 2017/0246602 | A1* | 8/2017 | Dean | B01F 13/1063 |

FOREIGN PATENT DOCUMENTS

| | | |
|---|---|---|
| WO | WO-2007/011241 A1 | 1/2007 |
| WO | WO-2012/073171 A1 | 6/2012 |
| WO | WO-2013/150070 A1 | 10/2013 |

OTHER PUBLICATIONS

International Preliminary Report on Patentability for PCT/EP2015/068681, dated Feb. 28, 2017.

* cited by examiner

PERSONALIZED SELECTOR DEVICE OF SUBSTANCES TO OBTAIN AND OPTIMIZE MIXTURES ABLE TO GENERATE BEVERAGES AND CONNECTED METHOD

FIELD OF THE INVENTION

The present invention concerns a selector device suitable to define and produce and optimize an extended variety of mixtures of different substances able to create a personalized beverage for the specific user. Said mixture with different compositions being suitable to generate a personalized and typical beverage for particular requirements of a specific person.

The present invention also concerns the connected method, provided to prepare the personalized formula of at least the mixture by means of a dedicated software.

More specifically, the present invention concerns personalized compositions or mixtures of substances such as types of tea, types of coffee, milk, cocoa, drinking chocolate or other substances, in particular for example liquid or solid substances, that are integrated with each other, as well as the natural and personalized ways of treating said mixtures so as to prepare the personalized beverage.

The personalized mixtures are suitable, on each occasion, to generate beverages with the purposes of relaxation, conviviality, for sporting activities, as supplements, infusions or with other particular or specific functions able to satisfy specific and particular requirements of that specific person.

Hereafter, merely by way of example, we will mainly describe the case of coffee mixtures, but within the spirit of the invention, the description is also applicable in the case of tea, cocoa, drinking chocolate, milk or other substances, alone or to be integrated with each other or with the coffee or tea, and/or with other substances depending on the function to which the beverage is destined, due to the specific requirements of a specific, identifiable person.

BACKGROUND OF THE INVENTION

It is known that connoisseurs of coffee or tea want to obtain mixtures that produce a beverage able to satisfy their personal taste and sensory profile.

It is also known that there are connoisseurs of sport drinks and energy drinks, infusions of various types, and that said connoisseurs want to obtain drinks which meet their specific requirements.

It is also known that there are medical substances that constitute compositions of various products and that are intended for specific functions of the body, since said functions are uniform, without taking into account the requirements of the specific patient.

Therefore, the inventive idea creates the possibility for a specific user, depending on the specific equipment of the device according to the invention, to define the mixture that exactly meets his/her requirements, whether they are for the senses, for sport, energizing, tranquillizing or sanitizing or functional for his/her body.

Currently, however, it is possible to obtain beverages with predefined mixtures, or beverages with do-it-yourself mixtures.

In the first case, beverages obtained with predefined mixtures (such as coffee, tea, sports drinks, energy drinks or those intended for specific functions for the body and already on the market) cannot satisfy the sensory, physical or physiological requirements, or the requirements of performance or the purposes of the user, inasmuch as they express a mean value which is in any case predefined.

In the second case, that is, do-it-yourself, the mixture obtained and hence the resulting beverage, can contain ratios of the components in size and quantity that are not favorable, or not compatible for the correct management of that specific body. Furthermore, do-it-yourself mixtures or predefined mixtures can include components that are not suitable or not compatible with each other and/or for that specific body and/or for that function.

There is therefore a need to obtain a personalized selector device of substances to obtain and optimize mixtures able to generate personalized beverages and connected method, which can overcome at least one of the disadvantages of the state of the art.

In particular, the purpose of the invention is to obtain a device, management and control means and connected personalized software, all targeted, according to the constitutive and organizational structure, for one and/or other type of beverage, in any case personalized, both for the specific user and also the specific function for the specific user. While the inventive idea allows do-it-yourself compositions based on sensory requirements or aromatic profile, or sporting and/or energizing and/or functional purposes, taking into account the characteristics specified by the user, it also avoids creating mixtures in which there are unbalanced and/or unsuitable and/or incompatible components in relation to the function it has to perform and coherent with the requirements of the specific person.

The whole is managed by a software able to generate personalized formulas depending on the specific functions that the beverage to be obtained must perform in the specific individual.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

According to the invention, a system to analyze the precise and targeted requirements of a specific individual, integrated in a specific software, allows to obtain and optimize a formula of a personalized mixture for the specific individual and the functional requirements that the beverage that is obtained with the mixture must perform in the specific individual.

The invention provides that the personalized mixture is obtained by using a device that provides a series of containers, in which substances are present that are different in type or variety.

The device cooperates with an equipped system that is controlled by a management system in which there is at least a personalized formula in terms functional to its purposes for that human body, or for the sensory requirements of a specific human body.

The use of the present invention for animals also comes within the spirit of the invention.

The formula of the mixture is obtained by means of a software that manages the selection and the quantity of the various components; the software controls the conformity and/or appurtenance and/or compatibility connected with the specific function that the beverage obtained with the mixture must perform in the body of that specific person.

The formula is able to be generated using the software present directly on the device, or in remote stations and then transmitted to the device.

In the device that delivers the mixture formulated according to the personalized formula of the invention, a system to control the substance of the formula may also be present. If there is a system to control the formula present in the device that delivers the mixture, the formula transmitted to the device must carry with it the basic parameters according to which the formula was generated.

According to the invention, the mixtures obtained can be of various types:
- a first type is obtained from the composition of seeds and/or grains and/or leaves or other components that are generically suitable to obtain the targeted and personalized beverage;
- a second type of composition that, starting from the first type, is ground, crushed and/or pulverized to be ready to obtain the targeted and personalized beverage;
- finally there is the beverage obtained with the composition of the first type, treated and made operative as in the second type, a specific and personalized beverage for that function, with that degree of activity for that specific individual.

It comes within the spirit of the invention to preserve the mixtures, as regards environment, temperature, oxidation etc., and possibly also the ingredients present in one and/or the other of the types identified above, for example by preservation in a controlled atmosphere and optimum preservation conditions.

In the case of coffee, as a simple example, the basic form is the toasted or ground coffee beans.

It is known that in the case of coffee and tea (but also other types of beverage), milk, cocoa, fruit extracts etc. can be added to the final mixture, in order to obtain the desired final personalized beverage either hot or cold, for that specific person.

Furthermore, in order to reach the level requested by the specific user, the beverage can be the type that requires a determinate volume of water, a determinate temperature, a determinate infusion time or transformation time etc., depending on the specific type of beverage or the requirements of the specific user.

The invention will be described hereafter, by way of non-restrictive example, with main reference to the possible basic personalized mixture to obtain a coffee suitable to satisfy the specific sensory requirements of a specific user.

It is known that there are many different types of coffee, generally known as arabica, robusta, liberica, excelsa, stenophylla, mauretania, racemosa, etc.

Due to the caffeine content, the arabica type is usually preferred.

Arabica coffee, like all the other types of coffee (but this also applies to tea and chocolate and other basic types of vegetable material) is affected by the zone where it is cultivated, by climate problems etc.

Again by way of example, in order to clarify the inventive idea, there are various sub-types of arabica, or rather, mono arabica, that identify beans or seeds of the arabica type all coming from the same zone and the same year.

If we consider by way of example some types of mono arabica, the invention provides to create, by suitably measuring out all or a part of said types of mono Arabica, a personalized mixture that meets at least the specific sensory requirements of the aromatic profile of a specific person.

Containers will therefore be provided, each for a specific type of content and each container being associated with its own feed or pick-up device that cooperates with at least one measuring device. The measuring device can measure by weight or volume, depending on the type of substance such as leaves, seeds, grains, beans, powders, etc.

The measuring device is assisted by management and control means into which, in the software, the specific aromatic sensory profile of the specific user is present or is introduced, in order to obtain first the mixture and then the personalized beverage.

Thanks to the software, the sensory profile conditions the selection, in a reasoned and compatible manner, and the quantity of the various types of mono arabica (in this case) but also their percentage weight, so as to obtain the final formula of the personal and specific mixture for that individual.

It is quite obvious that, over time, an individual may vary his/her requirements depending on the functions that the special and unique mixture, specifically studied for him/her, must perform.

According to the invention, based on the formula it is actuating, the device is suitable to produce on each occasion a dose of targeted mixture, or a quantity "n" of doses, or a quantity in weight or in volume of "n" doses.

There are parameters of tolerance, suitability and compatibility in both the device through which the specific user generates the formula of the personalized composition of his/her specific mixture, and also possibly in the management and control means associated with the device.

Therefore, if in the preparation of a formula a composition is introduced that has one or more components that are not suitable for the function, not compatible with each other or for the function, or are excessive or limited in quantity, the software intervenes.

Both in the device that produces the mixture and also in the device that formulates the specific formula, in the event of non-suitability, incompatibility or incorrect ratios between the components, a composition is proposed that most approaches the desired mixture, or it is indicated that there are contrasting factors or limits, and what these are, so that the user can intervene immediately, or the operator can intervene. It is also possible that the user or operator will not follow the suggestions proposed, for example by making a manual selection of the formula.

It comes within the spirit of the invention to provide preservation means, to preserve the basic substance and also the mixture in its various types, which do not alter the aromas or modify the qualities of the components, or which can provide for both.

It is thus possible that preservation occurs at a suitable temperature or also in a neutral or oxidizing or cooperating environment.

It also comes within the spirit of the invention, for example in the event of ready to use products, to provide, immediately downstream of the measuring device, possibly integrated in said device, at least one apparatus suitable to perform one or more intermediate operations which may be, on different occasions, grinding, crushing, pulverizing, or also grading the specific and personal beverage.

It also comes within the spirit of the invention to provide that said intermediate and/or final operation or operations are also conditioned by the aromatic sensory profile, or the type of use or function that the beverage has to perform in the particular case.

The intermediate operations, one or all, have graduations (in the case of coffee, for example there is more than one way of grinding). The graduations can be predefined during the formulation of the mixture or managed by the management and control means based on indications supplied by the user or made directly from the mixture to be made.

It also comes within the spirit of the invention to transform the mixture into a beverage separately or in an integrated phase in the device. For example, the transformation can be made by mixing, percolating (for example American coffee), infusing (for example tea or infusions) or extracting (espresso for example).

If the user requires a ready to use product, he/she will be able to indicate in the formula the supplementary components to be introduced, for example, into the beverage before use, and also the quantity of water, the temperature, possible other solvent elements, the time during which the beverage has to be obtained from the mixture, the pressure at which it has to be obtained etc.

In this case, according to the present invention, it may be the device that adds to the beverage the other substances required, or it may be the supplier of the beverage obtained with the personalized mixture that provides the prescribed addition.

By way of example, in the case of coffee or tea, the other substances can be, at different times, milk, chocolate, fruit extracts, aromatic substances etc., and the substances can be delivered either by the device that also produces the personalized mixture, or by the device that generates the beverage from the personalized mixture, or by the manager of the device that generates the beverage, obtaining from the device the information on the supplements that the specific user requests or desires for that personalized beverage.

Again in the case of coffee, but also tea, since as we said these are taken as examples, the user can modify how much water to use, the temperature of the water, the time needed to obtain the beverage from the mixture, the curve of pressure necessary etc.

According to other forms of embodiment, it is possible to provide that the device and method described here can advantageously operate only with defined and identified ingredients, for example associated with a specific producer and possibly a specific package. In particular, the device and method described here can be configured to recognize and use exclusively those defined and specific ingredients.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some forms of embodiment, given as a non-restrictive example with reference to the attached drawings wherein.

Figure 1:
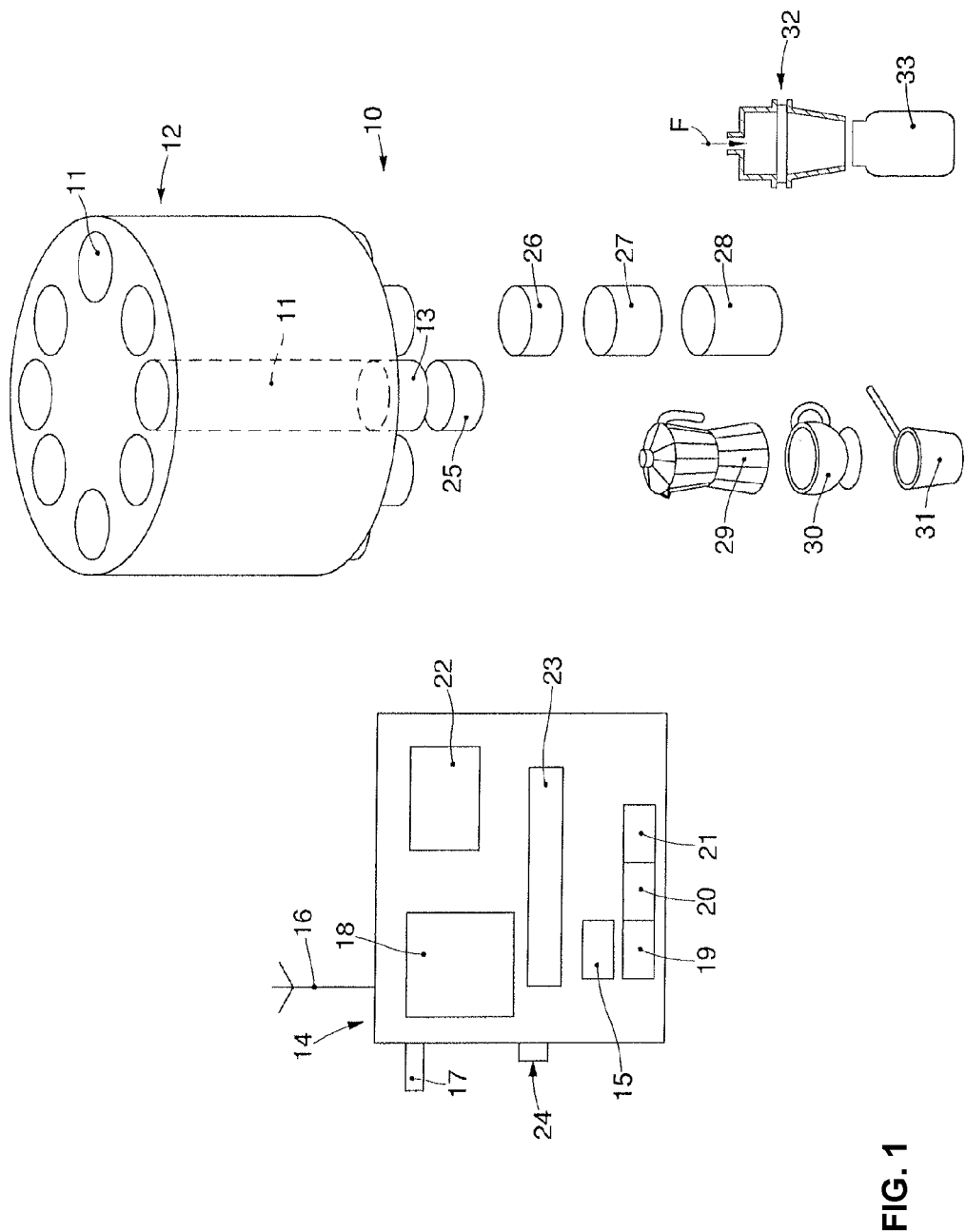
FIG. 1 shows the device, substantially schematically.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

We shall now refer in detail to the various forms of embodiment of the present invention, of which one or more examples are shown in the attached drawings. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

Forms of embodiment described here concern a selector device 10 to produce personalized mixtures for a specific requirement of substances intended to obtain and optimize beverages for a specific individual, comprising a plurality of containers 11 of basic substances, at least a measuring device 25 and management and control means 14. Advantageously, the device 10 can be integrated to obtain, on request, the beverages for that specific individual and for that function.

According to the present invention, the device 10 is associated to the management and control means 14 that carry out the instructions present in personalized formulas that express univocal sensory or functional profiles and specific requirements of a specific user.

With reference to FIG. 1, in the case given by way of example of coffee, and considering by way of example that the device 10 provides a combination of nine containers 11 of specific mono arabica. In the example, the containers 11 are associated with a rotary drum 12 which, for every container 11 and in correspondence with the base of the container 11, has a feed or pick-up or delivery device 13 that has a delivery controlled and controllable by the management and control means 14 of the device 10.

It is obvious that the geometric disposition of the containers 11 can vary, as they can be disposed in a row or rows or in any geometric figure.

It is clear that in possible forms of embodiment, the number of containers 11 can be more or less than nine. For example, there may be three, four, five, six, seven or eight containers 11, or ten, eleven, twelve or more than twelve. This can depend, for example, on the type of mixture to be obtained and hence on the maximum number of components that can be part of the mixture.

The device 10 is commanded, managed and controlled by the management and control means 14 which control every step, also depending on the specific personalized mixture it has to produce. The formula of the specific mixture is housed in a mixture memory 15 that possibly memorizes them as they are or in a personalized form.

The personalized form can be freely accessed by third parties with a reserved or prohibited circulation key code.

The formula of the mixture can be introduced via ether with any known data transmission system by means of a telematic connection 16, or a key 17, or other computer support. For example, the formula can be transmitted by a wireless connection or cabled connection.

The personalized formula can also, possibly, be created directly by the user, using an interface 18 possibly present in the management and control means 14.

The formula meets the sensory parameters or parameters of use or purpose that the interface 18 proposes on each occasion and that the specific user selects, until the balanced formula is obtained, suitable for that specific function which the beverage obtained from the mixture must perform.

The device 10 can also comprise a memory 19 which is associated with means 20 to verify and control the adequacy, compatibility and non-interference of the components of the mixture. Such control can be limited to the formula in itself, or can be extended to the specific function that the beverage has to perform with respect to the specific individual.

If the device 10 performs the controls and the components are not adequate, or not compatible, a unit 21 will advise the user that the formula has deficiencies, of other options and/or defects and which these are. At the same time, autonomously or on request from the user, the unit 21 can indicate a similar composition, or which components need to be revised, at the same time indicating limits and/or replacements. This interchange and dialog can take place by means of graphical and/or textual information which, to summarize, we will indicate here as questions 41 (see FIG. 2), implicit and/or explicit, and answers.

For example, the unit 21 can interact with the user to carry out the dialog and interchange of information by means of a display 22, that is, a screen or similar display element, and/or graphical elements and/or text, for example a graphic cursor, presented by the display 22, or by means of a telematic connection 16. For example, the display 22 can function as a user interface and the user can interact with the display 22 by means of input devices, such as buttons, keyboard, mouse, touch screen, voice command devices, optoelectronic input devices, gesture or movement recognition devices or other similar or comparable input devices.

In possible forms of embodiment, a keyboard 23 may be present, to allow the specific user and/or manager to introduce additional, corrective or modification data.

Once the device 10 has accepted the formula of the mixture, or in the case of a remote base where the user is formulating it, the supplements that can be added appear on the display 22, allowing the user to select them.

Furthermore, the display 22 can indicate other parameters that have to be associated with the formula, such as: degree of grinding, crushing or pulverization; temperature and/or pressure for treating the mixture to obtain the beverage, quantity of water used for a dose, its temperature, pressure, working time to obtain the beverage etc.

Therefore, if the mixture produced by the device 10 is exported, the inventive idea can provide the variant in which supplements and/or preservation modes, treatment, transformation into beverage and the characteristics of the beverage itself can be associated with the formula of the mixture.

On the display 22, if associated with the device 10, all the steps that are performed by the device 10 can possibly appear, as they are progressively performed.

The management and control means 14 can also be connected by means of a connection 24, by cable or via ether, with a remote processing system, with the function, for example, of controlling, even periodically, the functioning of the device 10 and possibly of data storage.

Both the management and control means 14 and the remote processing system can be remote from the device 10.

If the specific user leaves the formula of his/her own mixture available to other people, it is possible to put the formula on the web, associating it with the specific sensory parameters, parameters of use, purpose or function, possibly keeping the creator anonymous. In this sense the remote processing system can be delegated.

According to the instructions that the management and control means 14 supply to the device 10, the rotary drum 12, in this case, will present in position on each occasion the container 11 containing the specific substance to be measured.

When the desired container 11 is in position, the feed or pick-up or delivery device 13 begins to deliver the desired mono arabica in a controlled manner.

During the delivery of the desired quantity of specific substance, it is transferred to the measuring device 25, controlled by the means 20.

When the weight or volume of that component required by the formula of the mixture being prepared is reached, the feed or pick-up or delivery device 13 closes and the measuring device 25 transfers its content to a mixture container 26.

According to a variant, the measuring device 25 keeps inside itself the various components of the mixture until the specific mixture is defined in weight or volume according to its formula.

The preparation of a specific mixture can be done as a single dose or for "n" doses.

Once the mixture has been made in the desired formula and doses in the mixture container 26, the measuring device 25 can be cleaned with a jet of air and/or washed with jets of water and/or other solvent, and possibly dried.

In proposing the formula, and if the device 10 permits, the user can ask either for the mixture to be given to him/her, or can ask for it to be ground, crushed or pulverized in the desired particle size before it is given.

If the user requests another grinding, crushing or pulverization step, the mixture container 26 transfers its content to grinding, crushing or pulverization means 27, which are managed to obtain the particle size desired by the user as indicated by him/her.

Then the mixture, now ready to be transformed into beverage, can be sent either to a container 28 for the personalized preservation of the mixture obtained for the user, or to the step where the beverage is obtained.

In this case the personalized mixture, in the physical conditions desired by the user, can be introduced into a specific coffee pot 29, into a cup 30 where for example boiling water is poured for an infusion, into a pan 31 where it is boiled, or into percolation and/or extraction and/or infusion means 32, and sent to a container or chamber 33. To this purpose, FIG. 1 shows with an arrow F the introduction of boiling water and/or steam used in percolation and/or extraction.

The interaction takes place in the container or chamber 33 with a predefined quantity of pressurized water, and possibly pressurized air or other means suitable to emulsify, and at a temperature, all previously defined by the dedicated software, to produce the desired beverage. More bypass water can be added to the beverage, to obtain the final beverage in the cup with the right concentration and temperature.

Depending on the type of basic material contained in the container or containers 11, said container 11 will or will not be kept, in a known manner, in a neutral and/or not oxidizing or activating environment, possibly under slight pressure and at a predefined temperature, possibly extended to the specific measurer.

If one or more containers 11 are associated with a specific environment, the whole processing chain present in the device 10 will be subjected to the same environment.

Here and hereafter in the description, the term "chain" shall be taken to mean the operating progression which is carried out on each occasion, starting from the basic components to the step of obtaining the beverage.

Thus a first chain can stop at the container 27, a second can also concern the container 28 of the ground, crushed or pulverized mixture.

A third chain can arrive at the automatic positioning of the dose of mixture in the percolation and/or extraction and/or infusion means 32, if said means 32 are associated with the device 10.

Each container 11, depending on the material it contains, will be equipped with a feed or pick-up or delivery device 13, such as for example a screw, used in the case of seeds, grains or beans, or an adjustable shutter, possibly associated with a vibrator, in the case of leaves or suchlike, or a glass system, also oblong and possibly axially mobile or rotating, in the case of pulverized materials.

These and other dosed feed or pick-up or delivery devices 13 are substantially known and widely applied in the state of the art.

With regard to measuring, this can be by volume or by weight. In the case of dosing by volume, used in the case of particular formulas, the container 26 will advantageously be equipped with vibration means.

The device 10 will also be equipped with means to control the volume delivered on each occasion. The control means can be associated with the feed or pick-up or delivery device 13 and/or the container 26.

It comes within the spirit of the device that the containers 11 can be located on a rotary platform with controlled command, or on one or more rows.

In the case of a rotary platform, the delivery point will advantageously be always the same.

If the containers 11 are disposed in rows, the material delivered by the dedicated feed or pick-up device or delivery 13 will be translated to the collection point or the container 26 will be positioned on each occasion with respect to one or another of the dedicated feed or pick-up or delivery devices 13.

Figure 2:
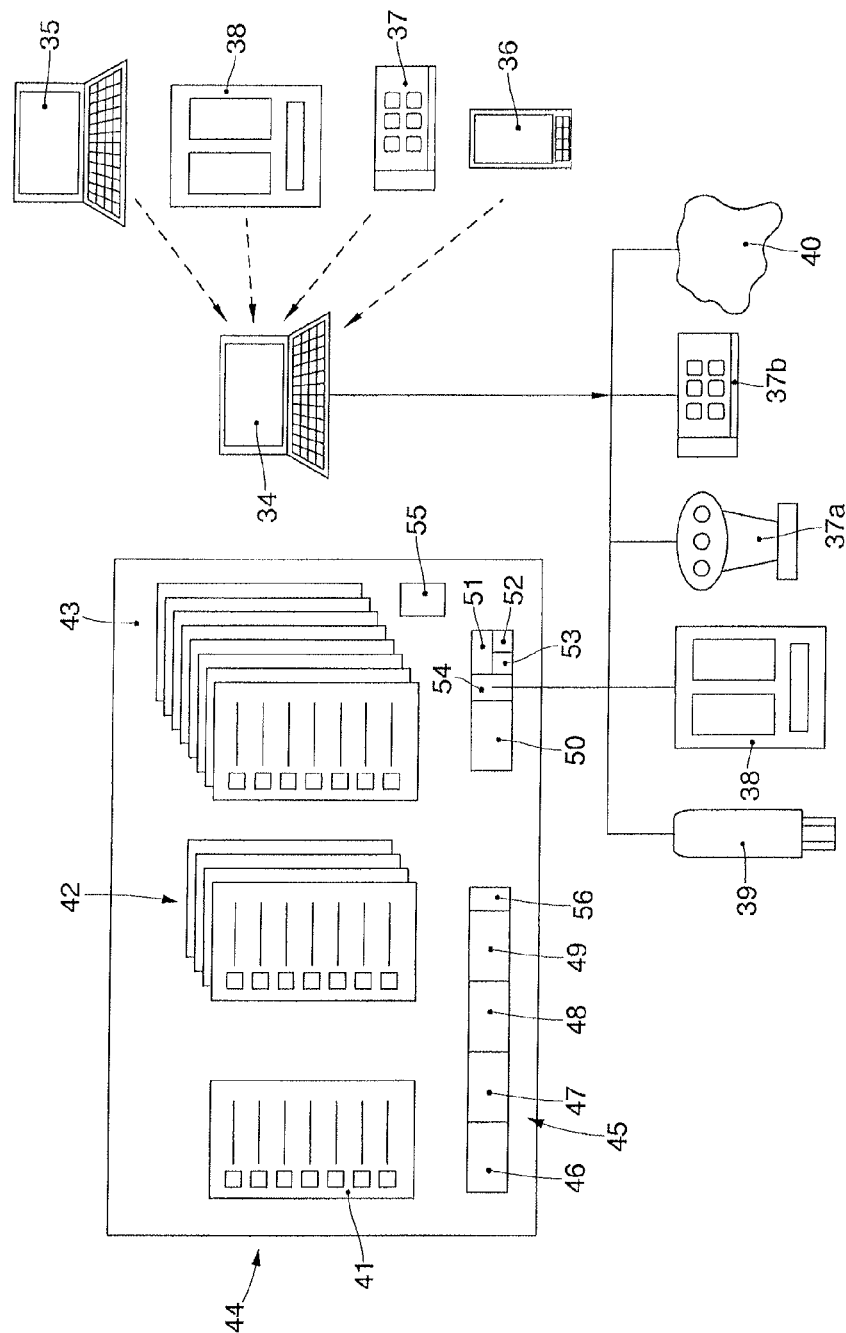
FIG. 2 schematically shows a possible functioning of the invention, in the case of coffee.

With reference to FIG. 2, this synthetically shows one of the operating possibilities of the invention to generate the personalized formula of the mixture, implemented in a specialized and dedicated software.

A central unit 34 has at least one or more memories suitable to contain the information that arrives, in a known manner, and suitable to control the source of information, to exert control and perform updating of the software present in the peripherals, to receive the personalized formulas of mixtures, associating them with the specific user and his/her specific requirements and possibly to control them, to identify whether said formulas are associated with a reserved code or are free, also possibly to be put on the web.

As indicated above, the peripheral sources contain a software suitable either to define the personalized formula of the specific mixture or to enter into the central unit 34 where they find the software to define the personalized formula. The peripheral sources are suitable to present to the specific user the questions 41 and the information connected to obtaining the personalized formula, complete with the supplements, and the methods for treating the mixture and obtaining the beverage. Once the complete formula of the mixture has been perfected, it will be possibly transmitted to the central unit 34.

The peripheral sources can be of the most varied type, and include, by way of example, a processor 35, a smart phone or tablet 36, a public or private coffee machine 37, a vending machine 38 etc.

The information regarding the personalized formula of the mixture can be transmitted and/or incorporated in a key 39 or other transportable support, in a vending machine 38, in a private 37a or public 37b coffee-making machine, or it can be stored or put on the web 40.

The personalized information is stored, or communicated on each occasion to the device 10, in order to obtain the specific and personalized formula of the mixture and possibly until the beverage is obtained.

Schematically and synthetically, a software 44 that allows to define the personalized formula of the mixture and that has a suitable integrated series of screens, proposes to the user an organized and targeted series of questions 41, in graphical and/or textual format, implicit or explicit, which can require a level 42 or several levels 43, up to 4, 5, 6 or 7 ever deepening levels. The purpose of the questions 41 is to examine the requirements, tastes and purposes of the user, and the answers that he/she gives on each occasion are processed and remain confidential.

If the basic data that have allowed to obtain the formula of the mixtures, with indication of the supplements or the method for obtaining the beverage, have to follow the formula so that it can be controlled, for example regarding veracity and/or adequacy, said basic data will be made visible in a reserved manner only by the system that performs said controls before the mixture is delivered.

When the questions that allow the formula 50 to be obtained are finished, the user can define other parameters such as for example: temperature 46, time 47 and chemical-physical characteristics of the diluent used in transforming the mixture into beverage. The user can then also define the volume 48 and temperature of the beverage he/she wants to obtain, pressure 49 and time required for obtaining the beverage, and also other possible additional and/or supplementary elements 56. The desired value of particle size may also be indicated, the supplementary materials and at what point in the cycle of obtaining the beverage they have to be introduced, etc.

The user can also indicate, using a specific choice 54, how many doses he/she requires on each occasion and whether said doses must be individual or put in a single container.

As additional factors 56 he/she can indicate, for example, quantity of water, temperature, infusion time, hydraulic and/or pneumatic pressure, additional elements to be introduced into the beverage, such as chocolate, milk or other, and in what condition.

Once the formula 50 is obtained, the user will introduce 51 his/her personalized code if he/she wants to keep the formula reserved, or will indicate whether it has to be stored 53 and on what support, or again whether it can be put on the web, possibly associated with his/her own name, and other possible information 52.

In this way, if the device 10 is not associated directly with the coffee machine 37, or does not have incorporated in it also the function 32 of preparing the coffee, the device 10 will deliver the required doses and the user will be able to use them in the coffee machine 37 or other machine.

The device 10, delivering the doses, if they are given to the user and not immediately used by the device 10 to directly obtain the beverage, will be able to carry the additional information for the coffee machine 37 so that it is governed by said additional information (temperature, time, volume, pressure, infusion time, supplements etc.) to provide the user with the desired beverage in the desired quantity and dosage.

The software 44 can also have the possibility to perform a revision 55, both of the formula, the technical characteristics and the applicative and/or integrative factors.

It is clear that modifications and/or additions of parts may be made to the device 10 suitable to generate personalized mixtures of substances to obtain and optimize mixtures able to generate personalized beverages and to the system for creating the formula of the mixtures as described heretofore, without departing from the field and scope of the present invention.

It is also clear that, although the present invention has been described with reference to some specific examples, a person of skill in the art shall certainly be able to achieve many other equivalent forms of personalized selector device of substances to obtain and optimize mixtures able to generate personalized beverages, having the characteristics as set forth in the claims and hence all coming within the field of protection defined thereby.

The invention claimed is:

1. A device to produce personalized mixtures of substances intended to obtain and optimize coffee beverages for a specific individual or user, the device comprising:
   a plurality of containers containing ground or whole coffee beans;
   a first variety of ground or whole coffee beans contained in a first container of the plurality of containers, and a second variety of ground or whole coffee beans contained in a second container of the plurality of containers;
   at least a measuring device; and
   a delivery device for delivering ground or whole coffee beans, the delivery device coupled to each container of the plurality of containers and disposed upstream from the measuring device, the delivery device operatively connected to the measuring device;
   a control unit comprising a verification and control device and a mixture memory storing a plurality of formulas of specific mixtures, the control unit adapted to control the delivery device to deliver at least one of the first and second varieties of whole or ground coffee beans in a controlled manner to form a personalized mixture of ground or whole coffee beans, the control unit adapted to extract coffee from the personalized mixture to provide a coffee beverage;
   a second memory containing compatibility data of specific mixtures, the second memory disposed in the control unit and connected to the verification and control device;
   the control unit configured to control the measuring device and to optimize balancing and suitability of the personalized mixture of ground or whole coffee beans based on a comparison with the compatibility data stored in the second memory;
   an advice and dialogue unit configured to provide a feedback to a specific individual or user based on the comparison performed by the control unit;
   wherein the device is associated with the control unit configured to carry out instructions regarding at least one personalized formula that expresses a univocal sensory profile or profile functional to the specific needs of the specific individual or user;
   wherein the verification and control device is configured to control the measuring device and to verify and control adequacy, compatibility, and non-interference of the components of the specific mixtures;
   wherein if the comparison control performed by the control unit reveals that the components of the personalized formula are not adequate or compatible, the advice and dialog unit is configured to carry out an interchange and dialog with the user via questions and answers provided by graphical and/or textual information on a display to indicate a similar composition or components to be revised, and their limits or replacements;
   once the personalized formula is accepted, the control unit is configured to indicate to the user, via said display, parameters to be defined by the user and associated with the personalized formula, said parameters being selected among one or more of: particle size or degree of grinding, crushing or pulverization of the coffee beans; temperature and/or pressure for treating the personalized mixture to obtain the coffee beverage, quantity of water used for a dose defining the final volume of the coffee beverage, water temperature, water pressure, or working time to obtain the coffee beverage.

2. The device as in claim 1, wherein the at least one personalized formula is conditioned and optimized and has a balanced and coherent composition of the ground or whole coffee beans that make up the personalized formula of a univocal and personalized mixture.

3. The device as in claim 1, wherein the at least one personalized formula is provided to control a dosage of the ground or whole coffee beans of the personalized mixture, the personalized formula contains instructions for subsequent operations to treat and finalize the personalized mixture.

4. The device as in claim 3, wherein the instructions of the personalized formula correspond to steps of activation of the device to obtain the personalized mixture.

5. The device of claim 1, comprising a rotary drum housing the plurality of containers.

6. A method to generate personalized formulas of coffee beverage mixtures for univocal users, the method comprising:
   providing a plurality of questions related to operating functions for providing a coffee beverage having a personalized formula;
   receiving a plurality of replies to the plurality of questions, the plurality of replies indicating operating information for providing a coffee beverage mixture;
   generating the personalized formula of the coffee beverage from the plurality of replies provided by the specific user to the plurality of questions;
   comparing the personalized formula with compatibility data of specific mixtures via a control unit, the control unit including a mixture memory storing a plurality of formulas of the specific mixtures and a second memory containing compatibility data of specific mixtures;
   in response to the comparison revealing that components of the personalized formula are not adequate or compatible, carrying out an interchange and dialog with the specific user via questions and answers provided by at least one of graphical or textual information on a display to indicate a similar composition or components to be revised, and their limits or replacements;
   once the personalized formula is accepted, displaying options of operating functions for modifying the coffee beverage mixture, the options comprising parameters to be defined by the user and associated with the personalized formula, said parameters being selected among one or more of: particle size or degree of grinding, crushing or pulverization of coffee beans; temperature and/or pressure for treating the mixture to obtain the coffee beverage, quantity of water used for a dose defining the final volume of the coffee beverage, water temperature, water pressure, or working time to obtain the coffee beverage;

extracting the personalized coffee beverage from the coffee beans of the coffee beverage mixture;

verifying and controlling adequacy, compatibility, and non-interference of the components of the specific mixtures.

7. The method according to claim 6, further comprising carrying out instructions of the personalized formula of the coffee beverage, the personalized formula comprises the operating information for transforming the coffee beverage mixture into a personalized coffee beverage.

8. The method as in claim 6, further comprising:
performing operating functions according to the personalized formula, wherein performing operating functions includes mixing ingredients to provide the coffee beverage mixture;
obtaining the personalized coffee beverage starting from the personalized formula of the personalized coffee beverage mixture, wherein the personalized coffee beverage is provided following specific instructions from the specific user.

9. The method as in claim 8, wherein performing the operating functions includes transforming the coffee beverage mixture into a mixture which is directly usable to obtain the personalized coffee beverage, wherein transforming includes at least one of steps (a) or (b), wherein (a) comprises grinding coffee beans, and (b) comprises crushing and pulverizing coffee beans according to an indication of particle size.

10. The method as in claim 8, wherein displaying the options of the operating functions includes providing an option related to an addition of supplements.

* * * * *